United States Patent
Kim et al.

(10) Patent No.: US 11,801,841 B2
(45) Date of Patent: Oct. 31, 2023

(54) ENGINE START CONTROLLER FOR HYBRID ELECTRIC VEHICLE AND METHOD THEREFOR

(71) Applicants: Hyundai Motor Company, Seoul (KR); Kia Corporation, Seoul (KR)

(72) Inventors: Sang Joon Kim, Seoul (KR); Lee Hyoung Cho, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 242 days.

(21) Appl. No.: 17/505,107

(22) Filed: Oct. 19, 2021

(65) Prior Publication Data
US 2022/0185291 A1 Jun. 16, 2022

(30) Foreign Application Priority Data

Dec. 15, 2020 (KR) .................. 10-2020-0175699

(51) Int. Cl.
| | |
|---|---|
| *B60K 6/48* | (2007.10) |
| *B60W 20/00* | (2016.01) |
| *F02B 67/06* | (2006.01) |
| *F02N 11/04* | (2006.01) |
| *B60W 30/192* | (2012.01) |
| *B60W 10/107* | (2012.01) |
| *B60W 10/06* | (2006.01) |

(Continued)

(52) U.S. Cl.
CPC ........... *B60W 30/192* (2013.01); *B60K 6/485* (2013.01); *B60W 10/06* (2013.01); *B60W 10/08* (2013.01); *B60W 10/107* (2013.01); *B60W 20/15* (2016.01); *B60K 2006/268* (2013.01); *B60W 2510/0241* (2013.01); *B60W 2510/0638* (2013.01); *B60W 2710/06* (2013.01); *B60W 2710/085* (2013.01)

(58) Field of Classification Search
CPC .. B60W 30/192; B60W 10/107; B60W 20/00; B60W 2710/085; B60K 2006/268
See application file for complete search history.

(56) References Cited

U.S. PATENT DOCUMENTS

| | | | | |
|---|---|---|---|---|
| 2012/0158226 A1* | 6/2012 | Prucka | .................. | B60W 10/08 701/22 |
| 2012/0178563 A1* | 7/2012 | Lee | ....................... | F16H 7/1281 474/110 |

(Continued)

FOREIGN PATENT DOCUMENTS

KR 10-2022-0084852 A 6/2022

*Primary Examiner* — Phutthiwat Wongwian
*Assistant Examiner* — Arnold Castro
(74) *Attorney, Agent, or Firm* — Fox Rothschild LLP

(57) ABSTRACT

An engine start controller for a hybrid vehicle and a method thereof are provided. The engine start controller includes a hybrid starter generator (HSG) that is connected to an engine by a belt, a sensor that is configured to measure an HSG speed, and a processor that applies a starting torque to the HSG. When starting the engine, the processor calculates an HSG speed estimated based on the applied starting torque and calculates an amount of slip of the belt using the HSG speed. In addition, the processor calculates a torque change rate correction value based on the calculated amount of slip, and corrects a rate of change rate in the starting torque based on the torque change rate correction value.

12 Claims, 9 Drawing Sheets

(51) Int. Cl.
B60W 10/08 (2006.01)
B60W 20/15 (2016.01)
B60K 6/485 (2007.10)
B60K 6/26 (2007.10)

(56) References Cited

U.S. PATENT DOCUMENTS

| | | | | |
|---|---|---|---|---|
| 2013/0138280 | A1* | 5/2013 | Kim | B60W 10/06 |
| | | | | 701/1 |
| 2018/0056972 | A1* | 3/2018 | Kim | B60W 20/00 |
| 2018/0170358 | A1* | 6/2018 | Choi | B60W 20/10 |
| 2019/0348939 | A1* | 11/2019 | Chung | H02P 23/08 |
| 2020/0325837 | A1* | 10/2020 | Choi | F02D 41/0007 |
| 2022/0388496 | A1* | 12/2022 | Park | B60W 10/06 |

* cited by examiner

ENGINE START CONTROLLER FOR HYBRID ELECTRIC VEHICLE AND METHOD THEREFOR

CROSS-REFERENCE TO RELATED APPLICATION

This application claims the benefit of priority to Korean Patent Application No. 10-2020-0175699, filed on Dec. 15, 2020, the entire contents of which are incorporated herein by reference.

TECHNICAL FIELD

The present disclosure relates to an engine start controller for a hybrid electric vehicle and a method therefor.

BACKGROUND

An engine start device may play a role in starting the engine of the vehicle to rotate the engine of the vehicle. Such an engine start device may include a starter motor and a generator. The starter motor may be used to start the engine in the internal combustion engine vehicle. When the starter motor is connected with the engine by the gear, a problem due to the slip does not occur when starting the engine. The generator may play a role in producing electrical energy to charge the battery. The generator is connected to the crankshaft to deliver electric power in the form of being directly connected with the engine.

Furthermore, since the generator and the engine are directly connected with each other, a problem due to the slip does not occur when starting the engine. Herein, as the generator is directly connected with the engine, there is a disadvantage in which a substantial amount of space is required upon packaging. To solve such a disadvantage, a structure of connecting the generator with the engine using a belt is proposed. In the structure of connecting the engine with the generator by the belt, noise and vibration may occur due to the generation of a revolutions per minute (RPM) difference between the engine and the generator, that is, a slip, a slip may excessively occur since the friction of the belt is varied according to environment conditions, and durability of the belt may be degraded.

SUMMARY

The present disclosure has been made to solve the above-mentioned problems occurring in the prior art while advantages achieved by the prior art are maintained intact. An aspect of the present disclosure provides an engine start controller for a hybrid electric vehicle for actively limiting a rate of change in starting torque of a hybrid starter generator (HSG) in a situation where a belt which connects the engine with the HSG is slipped and minimizing the slip of the belt to provide stable starting performance and a method therefor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling engine starting of a hybrid electric vehicle may include a hybrid starter generator (HSG) connected to an engine by a belt, a sensor configured to measure an HSG speed, and a processor configured to apply a starting torque to the HSG, when starting the engine, calculate an HSG speed estimated based on the applied starting torque and calculate an amount of slip of the belt using the HSG speed, calculate a torque change rate correction value based on the calculated amount of slip, and correct a rate of change in the starting torque based on the torque change rate correction value.

The processor may be configured to estimate the HSG speed according to the applied starting torque based on a nominal model. The processor may be configured to calculate the estimated HSG speed using a state observer. Additionally, the processor may be configured to calculate the torque change rate correction value in a form where the larger the amount of slip, the more limited the torque rate of change. The processor may be configured to calculate the torque change rate correction value in a form where the smaller the amount of slip, the less limited the torque rate of change. The processor may be configured to limit the rate of change in the starting torque such that the larger the amount of slip, the smaller the change in the starting torque. The processor may also be configured to limit the rate of change in the starting torque such that the smaller the amount of slip, the larger the change in the starting torque.

According to another aspect of the present disclosure, a method for controlling engine starting of a hybrid electric vehicle may include applying a starting torque to an HSG connected with an engine by a belt, when starting the engine, calculating an HSG speed estimated based on the applied starting torque after applying the stating torque to the HSG and calculating an amount of slip of the belt using the HSG speed, calculating a torque change rate correction value based on the amount of the slip, and adjusting a rate of change in the starting torque based on the torque change rate correction value. The calculating of the amount of slip of the belt may include estimating the HSG speed according to the applied starting torque based on a nominal model. The calculating of the amount of slip of the belt may include calculating the estimated HSG speed using a state observer.

The calculating of the torque change rate correction value may include calculating the torque change rate correction value in a form where the larger the amount of slip, the more limited the torque rate of change and calculating the torque change rate correction value in a form where the smaller the amount of slip, the less limited the torque rate of change. The adjusting of the rate of change in the starting torque may include limiting the rate of change rate in the starting torque such that the larger the amount of slip, the smaller the change in the starting torque and limiting the rate of change in the starting torque such that the smaller the amount of slip, the larger the change in the starting torque.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
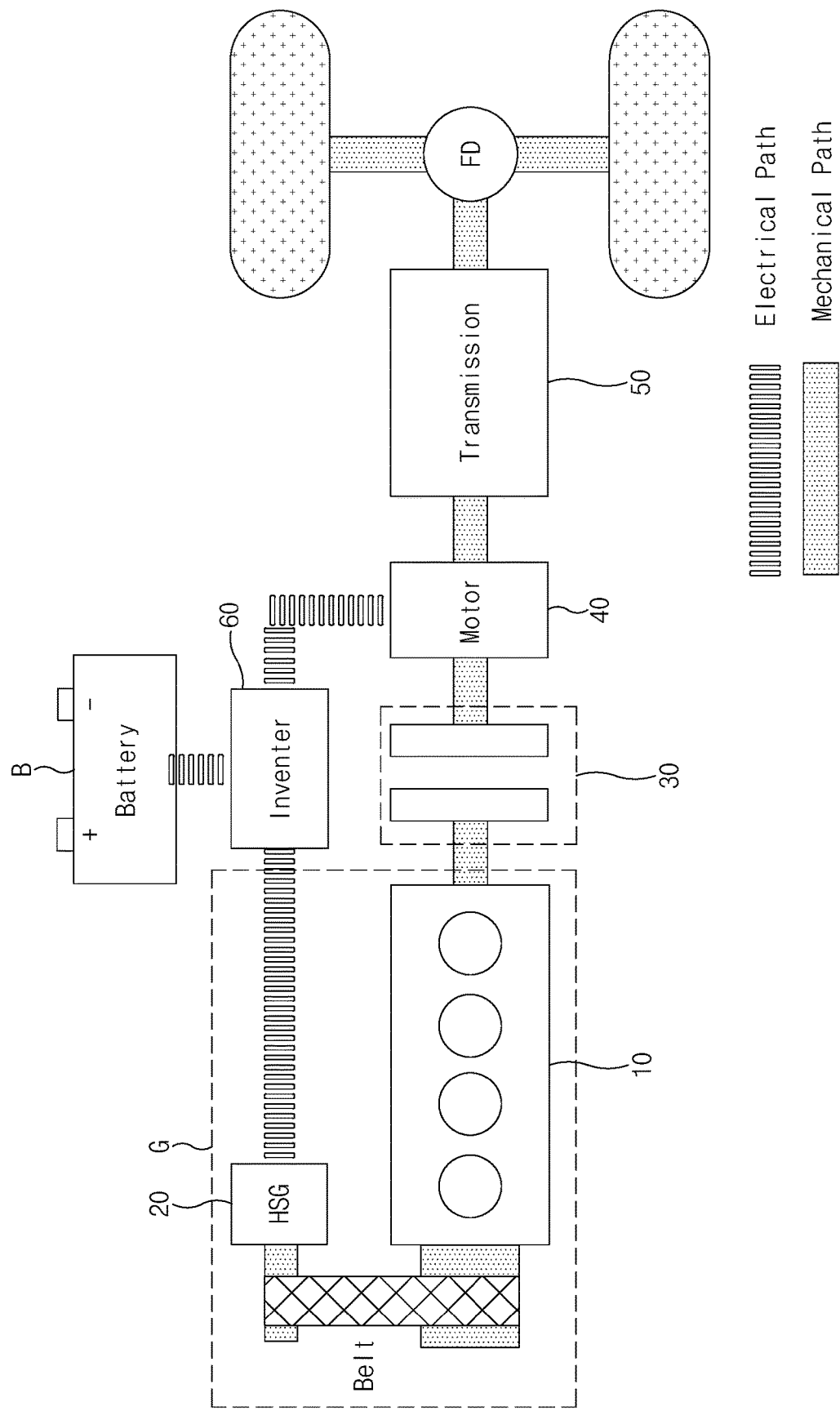
FIG. 1 is a drawing illustrating a configuration of a hybrid electric vehicle associated with the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a drawing illustrating a configuration of a hybrid electric vehicle associated with the present disclosure. The hybrid electric vehicle (HEV) is a vehicle which uses two or more different driving sources, which generally refers to a vehicle driven by an engine which burn fuel to generate a driving force and a motor which generates a driving force using electrical energy of its battery.

Referring to FIG. 1, the HEV may include an engine 10, a hybrid starter generator (HSG) 20, an engine clutch 30, a motor 40, a transmission 50, and an inverter 60. The engine 10 may burn fuel to generate electric power (an engine torque) necessary to drive the vehicle. Various well-known engines such as a gasoline engine or a diesel engine may be used as the engine 10. The engine 10 may control an output torque (i.e., an engine torque) under a command of an engine management system (EMS).

The HSG 20 may be connected with the engine 10 by a belt. The HSG 20 may crank the engine 10 to start the engine 10. The HSG 20 may play a role in starting the engine 10 when an electric vehicle mode switches to a hybrid mode. The HSG 20 may operate as a generator which generates electrical energy using electric power of the engine 10 in the state where the engine 10 is started. The electrical energy generated by the HSG 20 may be used to charge a battery B. The HSG 20 and the engine 10 may be collectively referred to as a plant G. The engine clutch 30 may be disposed between the engine 10 and the motor 40 to turn on/off an electric power (an output torque) of the engine 10. The engine clutch 30 may transmit or block an electric power (an engine torque) generated by the engine 10 to drive wheels (vehicle wheels) by being engaged or disengaged.

The motor 40 may be configured to receive power from the inverter 60 to generate electric power (motor electric power) and transmit the electric power to drive wheels. The motor 40 may be configured to change a rotation direction and a revolution per minute (RPM) under an instruction of a motor control unit (MCU) to adjust an output torque (a motor torque) of the motor 40. The motor 40 may be used as a generator which generates a back electromotive force when a state of charge (SOC) is insufficient or upon regenerative braking and charges the battery B. The battery B may play a role in supplying power necessary for driving of the vehicle, which may be implemented as a high-voltage battery. The battery B may be charged by regenerative energy generated by the motor 40.

The transmission 50 may be configured to convert the motor torque or the engine torque and the motor torque into a transmission ratio matched to a transmission stage (a gear stage). The transmission 50 may be configured to change a transmission stage under an instruction of a transmission control unit (TCU). The TCU may be configured to determine an optimum transmission stage based on information such as a driving speed of the vehicle (i.e., a vehicle speed or a wheel speed), a location of an accelerator pedal, an engine RPM, and/or a clutch travel by sensors in the vehicle.

The inverter 60 may be a power converter disposed between the motor 40 and the battery B, and configured to convert power output from the battery B into a motor drive power to supply the motor drive power to the motor 40. For example, the inverter 60 may be configured to convert a direct current (DC) voltage output from the battery B into a 3-phase alternating current (AC) voltage necessary to drive the motor 40. The inverter 60 may be configured to adjust power (e.g., an output voltage) supplied to the motor 40 under an instruction of a motor control unit (MCU) to adjust a motor torque. The present embodiment is exemplified as the inverter 60 is disposed between the motor 40 and the battery B, but not limited thereto. When the motor 40 applied to the vehicle is a DC motor, a converter may be disposed between the motor 40 and the battery B or the motor 40 and the battery B may be directly connected to each other without using the power converter.

Figure 2:
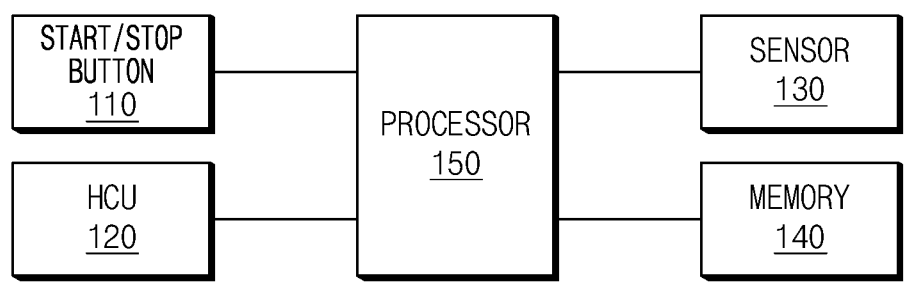
FIG. 2 is a block diagram illustrating a configuration of an engine start controller for a hybrid electric vehicle according to embodiments of the present disclosure.

FIG. 2 is a block diagram illustrating a configuration of an engine start controller for a hybrid electric vehicle according to embodiments of the present disclosure. Referring to FIG. 2, an engine start controller 100 may include a start and stop (start/stop) button 110, a hybrid control unit (HCU) 120, a sensor 130, a storage 140, and a processor 150. The processor 150 may be connected with the start/stop button 110, the HCU 120, and the sensor 130 over a vehicle network. The vehicle network may be implemented as a controller area network (CAN), a media oriented systems transport (MOST) network, a local interconnect network (LIN), an Ethernet, an X-by-Wire (Flexray), and/or the like.

The start/stop button 110 may be configured to generate a command to turn on the power of the vehicle, a command to start the engine (turn on the engine), a command to stop the engine (turn off the engine), or the like depending on manipulation of the user. For example, the start/stop button 110 may be configured to generate a vehicle power on signal, when the user pushes or otherwise engages the start/stop button 110 once, generate an engine start signal, when the user pushes the start/stop button 110 once again, and generate an engine stop signal, when the user pushes the start/stop button 110 while adjusting the shift lever into the P stage. The present embodiment is exemplified as the start/stop button 110 is implemented as a push button, but not limited thereto. The start/stop button 110 may be implemented as a pull button, a toggle switch, a rotary switch, a touch button, and/or the like.

The HCU 120 may be configured to recognize or detect a driving environment using sensors (e.g., a speed sensor, a shift lever position sensor, and the like) loaded into the vehicle. The HCU 120 may be configured to operate an engine 10, an HSG 20, an engine clutch 30, a motor 40, a transmission 50, an inverter 60, and a battery B of FIG. 1 based on the driving environment of the vehicle. The HCU 120 may be configured to transmit a command to start or stop the engine 10 to the processor 150 based on the driving environment of the vehicle. When the vehicle meets an engine start condition in an engine stop state, the HCU 120 may be configured to transmit an engine start command to the processor 150. When the vehicle meets an engine stop condition in an engine run state, the HCU 120 may be configured to transmit an engine stop command to the processor 150. For example, the HCU 120 may be configured to transmit an engine start command, when a vehicle driving mode switches from an electric vehicle (EV) mode to a hybrid electric vehicle (HEV) mode, and may be configured to transmit an engine stop command, when the vehicle driving mode switches from the HEV mode to the EV mode. Such an HCU 120 may include at least one processor, a memory, and a network interface.

The sensor 130 may be configured to measure an angular velocity (a rotational velocity) of the HSG 20. The sensor 130 may be implemented as an angular velocity sensor, a rotary angle sensor, and/or the like. The sensor 130 may be configured to deliver the measured angular velocity (i.e., an HSG speed) to the processor 150. The memory 140 may be a non-transitory storage medium which stores instructions executed by the processor 150. The memory 140 may be implemented as at least one of storage media (recording media) such as a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), and/or a register.

The processor 150 may perform the overall control of the engine start controller 100. The processor 150 may be implemented as at least one of processing devices such as an application specific integrated circuit (ASIC), a digital signal processor (DSP), programmable logic devices (PLD), field programmable gate arrays (FPGAs), a central processing unit (CPU), microcontrollers, and/or microprocessors. The processor 150 may be configured to receive an engine start command or an engine stop command from the start/stop button 110 or the HCU 120. In response to receiving the engine start command, the processor 150 may be configured to set a target starting torque of the HSG 20 for increasing an engine speed before engine fuel injection and may command (instruct) the HSG 20 to generate the target starting torque. The processor 150 may be configured to compare the set target starting torque with a real output torque of the HSG 20 and may be configured to adjust a starting torque of the HSG 20 depending on the compared result. In other words, the processor 150 may be configured to determine a starting torque of the HSG 20 (an HSG starting torque) such that the real output torque of the HSG 20 follows the set target starting torque.

The processor 150 may be configured to operate a motor of the HSG 20 based on a reference torque rate of change stored in the memory 140, when the engine 10 starts. The reference torque rate of change may be set as a default in advance by a system designer, which may be defined as a starting torque over time. The processor 150 may be configured to measure an angular velocity (an HSG speed) of the HSG 20 using the sensor 130 after an HSG starting torque command. When applying the starting torque to the HSG 20, the processor 150 may be configured to estimate an HSG speed according to the applied starting torque based on a nominal model.

The processor 150 may be configured to compare the estimated HSG speed with the HSG speed measured by the sensor 130 to detect that a slip (disturbance) is generated. The processor 150 may be configured to calculate a difference between the estimated HSG speed and the measured HSG speed to calculate an amount of slip. Additionally, the processor 150 may be configured to variably (actively) adjust an increasing rate of change in starting torque based on the calculated amount of slip. The processor 150 may be configured to calculate a torque change rate correction value of the HSG 20 based on the calculated amount of slip. The processor 150 may be configured to calculate a slew rate of the starting torque such that the previously calculated starting torque varies with the torque change rate correction value.

Hereinafter, a description will be given of a slip detection process and a control torque calculation process with reference to FIGS. 3 to 6B.

Figure 3:
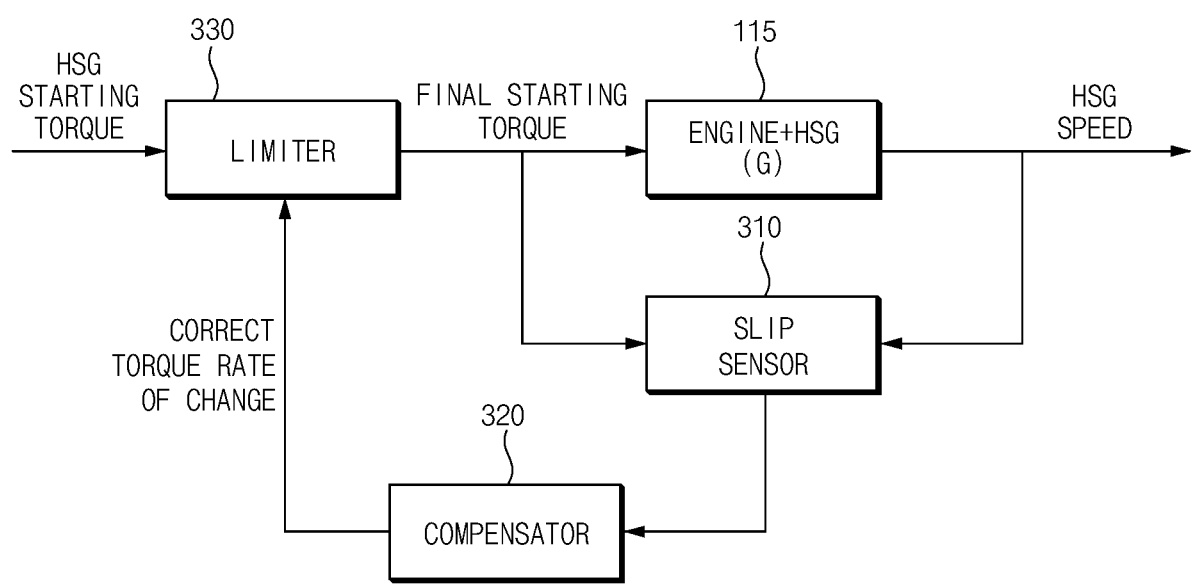
FIG. 3 is a functional block diagram illustrating an engine start controller according to embodiments of the present disclosure.
Figure 4:
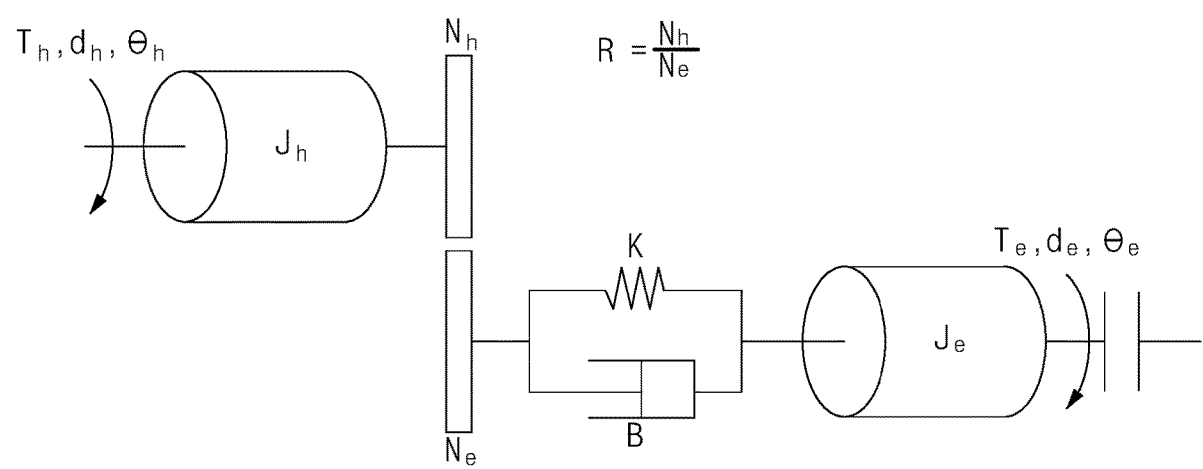
FIG. 4 is a drawing illustrating an equivalent circuit of an engine and an HSG according to embodiments of the present disclosure.
Figure 5:
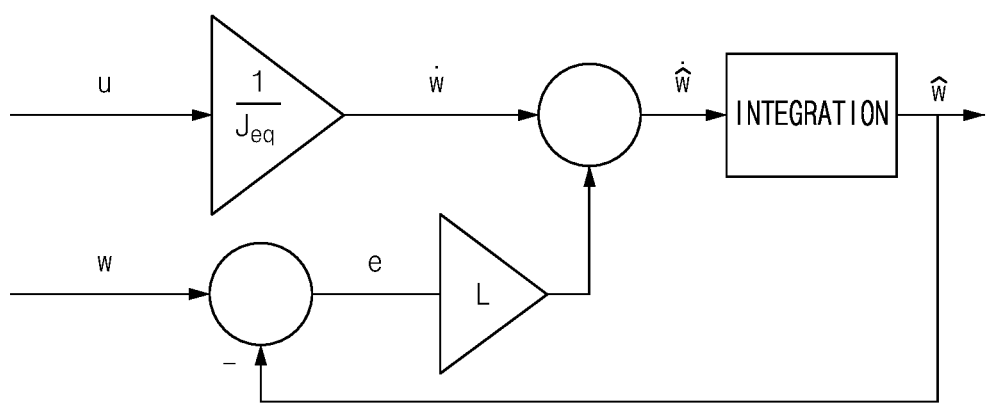
FIG. 5 is a drawing illustrating a configuration of a state observer according to embodiments of the present disclosure.
Figure 6A:
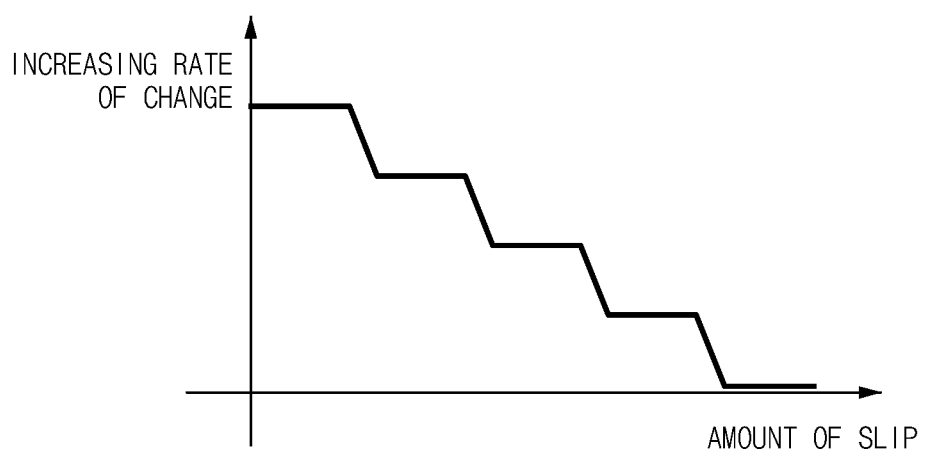
FIG. 6A is a graph illustrating an increasing rate of change according to an amount of slip associated with the present disclosure.
Figure 6B:
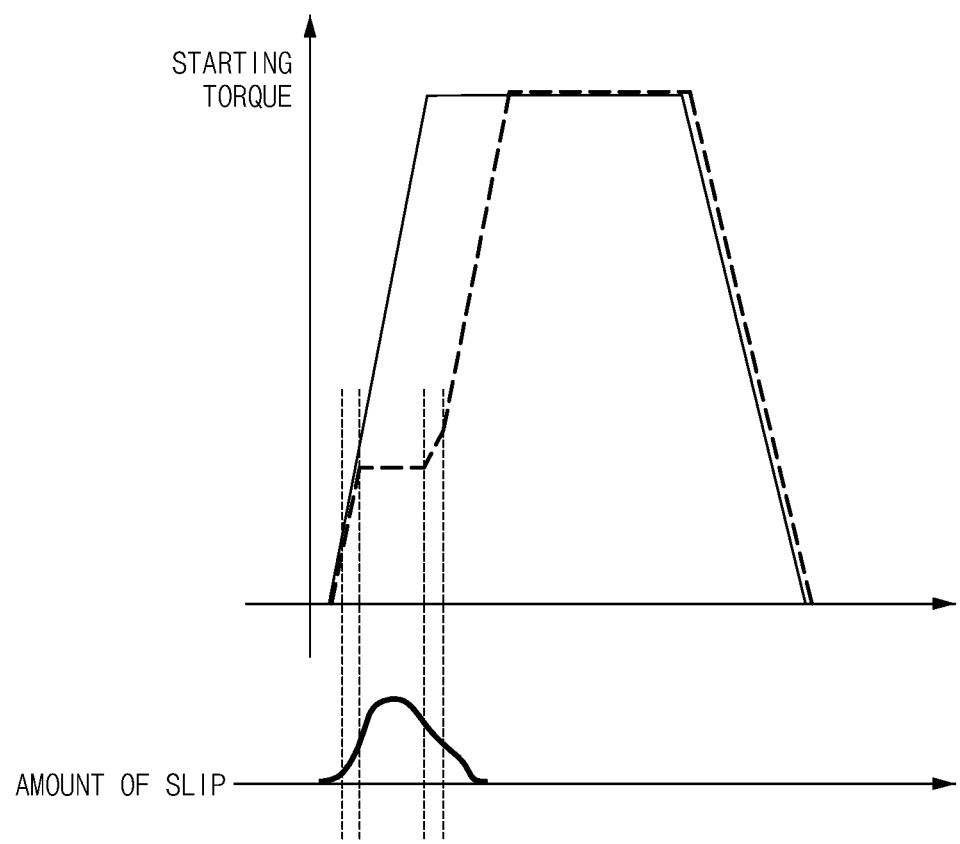
FIG. 6B is a graph illustrating a change in starting torque according to an amount of slip associated with the present disclosure.

FIG. 3 is a functional block diagram illustrating an engine start controller according to embodiments of the present disclosure. FIG. 4 is a drawing illustrating an equivalent circuit of an engine and an HSG according to embodiments of the present disclosure. FIG. 5 is a drawing illustrating a configuration of a state observer according to embodiments of the present disclosure. FIG. 6A is a graph illustrating an increasing rate of change according to an amount of slip associated with the present disclosure. FIG. 6B is a graph illustrating a change in starting torque according to an amount of slip associated with the present disclosure.

An engine start controller 100 may include a plant (G) 115, a slip sensor 310, a compensator 320, and a limiter 330. The plant (G) 115 may be represented as an engine 10 and an HSG 20 which are connected by a belt. When the engine 10 starts, the HSG 20 may be configured to generate a torque under a command of the engine start controller 100 to increase revolutions per minute (RPM) of the engine 10. The engine start controller 100 may be configured to generally apply a maximum torque to the HSG 20 to increase the RPM of the engine 10 to specific RPM.

The slip sensor 310 may be configured to detect a slip of the belt which connects the engine 10 with the HSG 20 using a starting torque (a final starting torque) and an angular velocity (an HSG speed) of the HSG 20, which are input to the plant (G) 115. The slip sensor 310 may be configured to calculate an amount of slip of the belt based on a nominal model Gn. To calculate the amount of slip, the slip sensor 310 may be configured to derive the nominal model Gn indicating a target behavior (a reference behavior) of the plant (G) 115. An equivalent circuit of the plant (G) 115 may be represented as FIG. 3. K in the equivalent circuit shown in FIG. 4 is a spring constant in a mass damper spring model, which may be used to derive a nominal model using a system which has only inertia assuming that it is infinite. In the equivalent circuit, $T_h$, $d_h$, and $\theta_h$ respectively denote the output torque (HSG torque), the disturbance, and the rotary angle of the HST 20, $T_e$, $d_e$, and $\theta_e$ respectively denote the output torque (engine torque), the disturbance, and the rotary angle of the engine 10, and R denotes the ratio of the RPM $N_h$ of the pulley at the HSG 20 to the RPM $N_e$ of the pulley at the engine 10, that is, the pulley ratio between the engine 10 and the HSG 20.

An inertia moment of the nominal model may be represented as Equation 1 below.

$$J_{eq} = J_h + J_e/R^2(1-\lambda) \quad \text{Equation 1}$$

Herein, $J_h$ denotes the inertia moment of the HSG 20, $J_e$ denotes the inertial moment of the engine 10, and $\lambda$ denotes the slip ratio.

Since the slip ratio $\lambda$ should be minimized, when substituting $\lambda=0$ into Equation 1 above, the inertia moment $J_{eq}$ of the nominal model may be represented as Equation 2 below.

$$J_{eq} = J_h + J_e/R^2 \quad \text{Equation 2}$$

The slip sensor 310 may be configured to estimate an angular velocity (an HSG speed) of the HSG 20 using the nominal model. In other words, the slip sensor 310 may be configured to calculate an HSG speed according to a starting torque u of the HSG 20, that is, a nominal model speed $\omega$ based on the nominal model. In particular, the slip sensor 310 may be configured to calculate a nominal model speed using a state observer shown in FIG. 5.

The state observer may be configured to receive the starting torque u and the HSG speed $\omega$ measured by the sensor 130. The state observer may be configured to calculate the angular velocity $J_{eq}\dot{\omega}$ of the HSG 20 according to the starting torque u ($=J_{eq}\dot{\omega}$) of the HSG 20 using the nominal model. In other words, the state observer may be configured to obtain the angular velocity $J_{eq}\dot{\omega}$ by multiplying the starting torque u by $1/J_{eq}$.

The state observer may be configured to calculate a difference between the measured HSG speed $\omega$ and the estimated HSG speed $\hat{\omega}$, that is, the amount of slip $e(=\omega-\hat{\omega})$. The state observer may be configured to correct the amount of slip e by reflecting the correction gain L in the amount of slip e. The state observer may be configured to calculate the angular speed $J_{eq}\dot{\omega}$ and the corrected amount of slip to calculate the angular velocity $\hat{\omega}$ in which the corrected amount of slip is reflected. In other words, the state observer may be configured to estimate the angular velocity of the HSG 20 according to the starting torque u. The state observer may be configured to integrate the estimated angular velocity to calculate the HSG speed $\hat{\omega}$.

Further, the compensator 320 may be configured to limit a rate of change in starting torque to limit the amount of slip (disturbance) detected by the slip sensor 310. The compensator 320 may be configured to calculate a change rate correction value of the starting torque (e.g., a torque change rate correction value) based on the amount of slip calculated by the slip sensor 310. In other words, the compensator 320 may be configured to correct a predetermined starting torque change rate based on the amount of slip to obtain the torque change rate correction value. At this time, the compensator 320 may be configured to calculate the torque change rate correction value in a form where the larger the amount of slip, the more limited the rate of change in starting torque. Furthermore, the compensator 320 may be configured to calculate the torque change rate correction value in a form where the smaller the amount of slip, the less limited the rate of change in starting torque. For example, as shown in FIG. 6A, the larger the amount of slip, the smaller the compensator 320 may set an increasing rate of change in starting torque to be, and the smaller the amount of slip, the larger the compensator 320 may set the increasing rate of change in starting torque to be.

The limiter 330 may be configured to limit a slew rate such that the previously calculated starting torque varies with the torque change rate correction value. The limiter 330 may be configured to limit an increasing rate of change in starting torque based on the torque change rate correction value. Referring to FIG. 6B, the limiter 330 may be configured to determine a starting torque such that the larger the amount of slip, the smaller the change in starting torque, and may be configured to determine a starting torque such that the smaller the amount of slip, the larger the change in starting torque.

Figure 7:
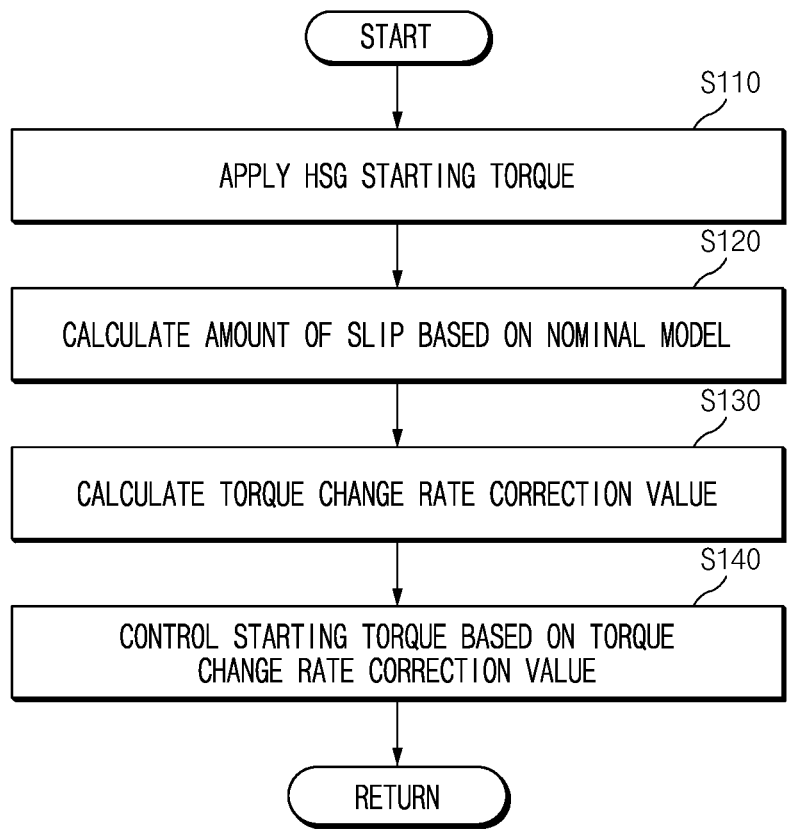
FIG. 7 is a flowchart illustrating an engine start method according to embodiments of the present disclosure.

FIG. 7 is a flowchart illustrating an engine start method according to embodiments of the present disclosure. Referring to FIG. 7, in S110, a processor 150 of FIG. 2 may apply a starting torque to an HSG 20 of FIG. 1 to start an engine 10 of FIG. 1. The processor 150 may determine an HSG starting torque to increase RPM of the engine 10.

After applying the starting torque, in S120, the processor 150 may be configured to calculate an amount of slip based on a nominal model. The processor 150 may be configured to obtain RPM (an HSG speed) of the HSG 20 using a sensor 130 of FIG. 2. The processor 150 may be configured to estimate an HSG speed according to the starting torque based on the nominal model. The processor 150 may be configured to calculate a difference between a real HSG speed and the estimated HSG speed to calculate the amount of slip.

In S130, the processor 150 may be configured to calculate a torque change rate correction value based on the calculated amount of slip. The processor 150 may be configured to calculate the torque change rate correction value in a form where the larger the amount of slip, the more limited the rate of change in starting torque, and calculate the torque change rate correction value in a form where the smaller the amount of slip, the less limited the rate of change in starting torque.

In S140, the processor 150 may be configured to adjust the starting torque based on the torque change rate correction value. The processor 150 may be configured to limit a rate of change in starting torque based on the torque change rate correction value. The processor 150 may be configured to calculate a starting torque (e.g., an HSG starting torque), the torque rate of change of which is limited based on the torque change rate correction value. The processor 150 may be configured to command the HSG 20 to generate the HSG starting torque. The HSG 20 may be configured to adjust an HSG torque under a command of the processor 150.

Figure 8:
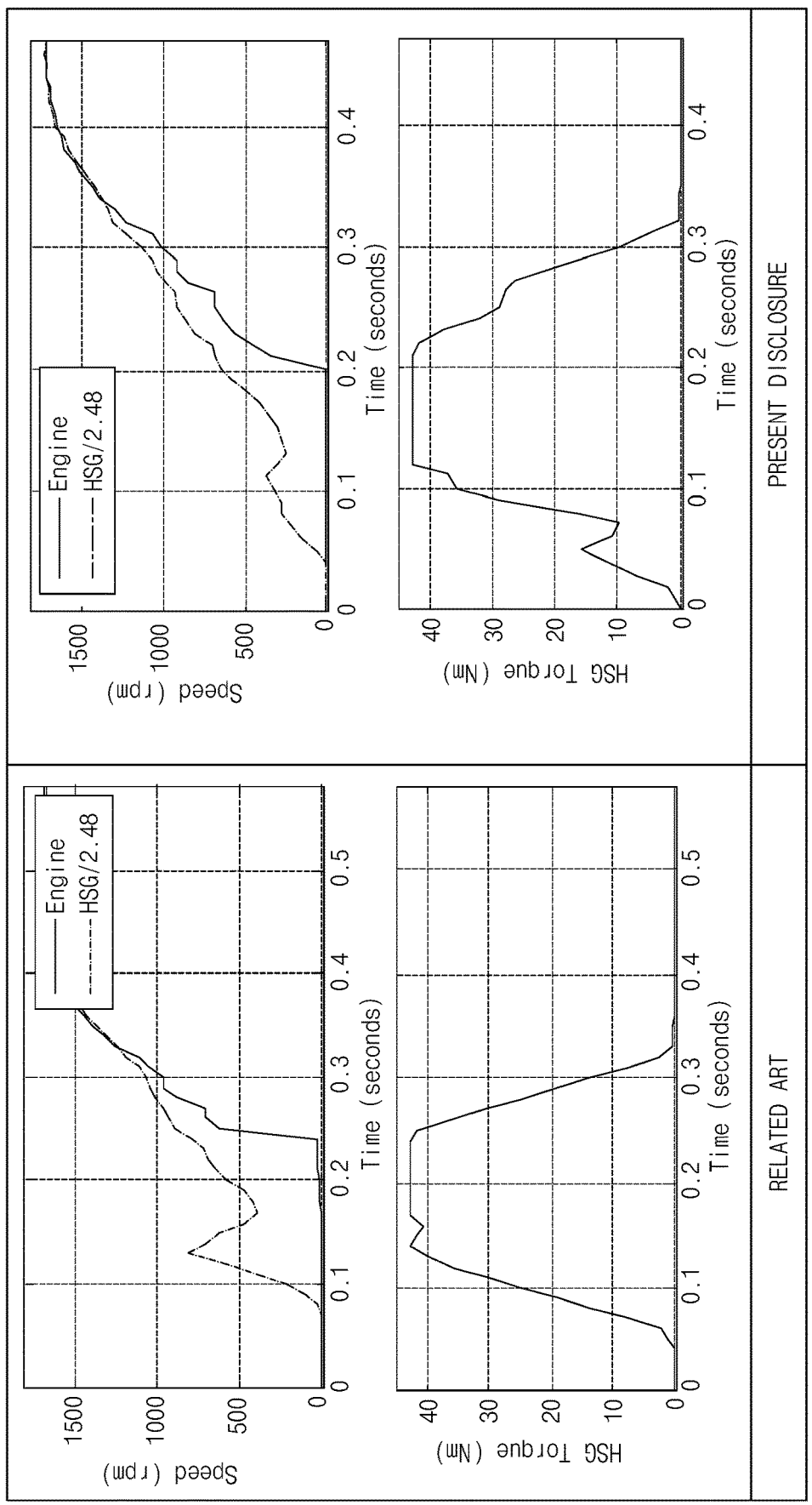
FIG. 8 is a drawing illustrating a change in belt slip according to a limit to a rate of change in HSG starting torque according to embodiments of the present disclosure.

FIG. 8 is a drawing illustrating a change in belt slip according to a limit to a rate of change in HSG starting torque according to embodiments of the present disclosure. Referring to FIG. 8, since the amount of slip is calculated in a situation where a slip of a belt which connects an engine 10 of FIG. 1 with an HSG 20 of FIG. 1 may be detected and since a rate of change in starting torque of the HSG 20 is limited based on the calculated amount of slip, the slip of the belt may be reduced. Thus, as the slip of the belt is reduced, performance of controlling the engine 10 and the HSG 20 may be improved in terms of noise, vibration, harshness (NVH), belt durability, and energy reduction.

Embodiments of the present disclosure may actively limit a rate of change in starting torque of the HSG in a situation where the belt which connects the engine with the HSG is slipped to minimize the slip of the belt, thus providing stable starting performance. Furthermore, embodiments of the present disclosure may variably control a rate of change in starting torque of the HSG based on the amount of slip of the belt to reduce the slip of the belt, thus reducing noise and vibration generated due to the slip of the belt and ensuring durability of the belt.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An engine start controller for a hybrid electric vehicle, comprising:
   a hybrid starter generator (HSG) connected to an engine by a belt;
   a sensor configured to measure an HSG speed; and
   a processor configured to apply a starting torque to the HSG, when starting the engine, calculate an HSG speed estimated based on the applied starting torque and calculate an amount of slip of the belt using the HSG speed, calculate a torque change rate correction value based on the calculated amount of slip, and correct a rate of change in the starting torque based on the torque change rate correction value.

2. The engine start controller of claim 1, wherein the processor is configured to estimate the HSG speed according to the applied starting torque based on a nominal model.

3. The engine start controller of claim 2, wherein the processor is configured to calculate the estimated HSG speed using a state observer.

4. The engine start controller of claim 1, wherein the processor is configured to calculate the torque change rate correction value in a form where the larger the amount of slip, the more limited the torque rate of change.

5. The engine start controller of claim 1, wherein the processor is configured to calculate the torque change rate correction value in a form where the smaller the amount of slip, the less limited the torque rate of change.

6. The engine start controller of claim 1, wherein the processor is configured to limit the rate of change in the starting torque such that the larger the amount of slip, the smaller the change in the starting torque.

7. The engine start controller of claim 1, wherein the processor is configured to limit the rate of change in the starting torque such that the smaller the amount of slip, the larger the change in the starting torque.

8. An engine start control method for a hybrid electric vehicle, comprising:
   applying, by a processor, a starting torque to a hybrid starter generator (HSG) connected with an engine by a belt, when starting the engine;
   calculating, by the processor, an HSG speed estimated based on the applied starting torque after applying the stating torque to the HSG and calculating an amount of slip of the belt using the HSG speed;
   calculating, by the processor, a torque change rate correction value based on the amount of the slip; and
   adjusting, by the processor, a rate of change in the starting torque based on the torque change rate correction value.

9. The engine start control method of claim 8, wherein the calculating of the amount of slip of the belt includes:
   estimating, by the processor, the HSG speed according to the applied starting torque based on a nominal model.

10. The engine start control method of claim 8, wherein the calculating of the amount of slip of the belt includes:
    calculating, by the processor, the estimated HSG speed using a state observer.

11. The engine start control method of claim 8, wherein the calculating of the torque change rate correction value includes:
    calculating, by the processor, the torque change rate correction value in a form where the larger the amount of slip, the more limited the torque rate of change; and
    calculating, by the processor, the torque change rate correction value in a form where the smaller the amount of slip, the less limited the torque rate of change.

12. The engine start control method of claim 8, wherein the controlling of the rate of change in the starting torque includes:
- limiting, by the processor, the rate of change rate in the starting torque such that the larger the amount of slip, the smaller the change in the starting torque; and
- limiting, by the processor, the rate of change in the starting torque such that the smaller the amount of slip, the larger the change in the starting torque.

* * * * *